United States Patent
Lucas

(10) Patent No.: US 10,227,504 B2
(45) Date of Patent: Mar. 12, 2019

(54) CROSSLINKERS FOR COATING COMPOUNDS

(71) Applicant: BASF SE, Ludwigshafen (DE)

(72) Inventor: Frederic Lucas, Mannheim (DE)

(73) Assignee: BASF SE, Ludwigshafen (DE)

( * ) Notice: Subject to any disclaimer, the term of this patent is extended or adjusted under 35 U.S.C. 154(b) by 52 days.

(21) Appl. No.: 15/024,153

(22) PCT Filed: Sep. 3, 2014

(86) PCT No.: PCT/EP2014/068682
§ 371 (c)(1),
(2) Date: Mar. 23, 2016

(87) PCT Pub. No.: WO2015/043894
PCT Pub. Date: Apr. 2, 2015

(65) Prior Publication Data
US 2016/0237310 A1    Aug. 18, 2016

(30) Foreign Application Priority Data

Sep. 25, 2013  (EP) .................................... 13185926

(51) Int. Cl.
*C09D 175/12* (2006.01)
*C08G 18/80* (2006.01)
*C08G 18/28* (2006.01)
*C08G 18/30* (2006.01)

(52) U.S. Cl.
CPC ....... *C09D 175/12* (2013.01); *C08G 18/2805* (2013.01); *C08G 18/302* (2013.01); *C08G 18/307* (2013.01); *C08G 18/807* (2013.01); *C08G 18/8061* (2013.01)

(58) Field of Classification Search
CPC ............ C08G 18/2805; C08G 18/8061; C08G 18/807; C08G 18/302; C08G 18/307; C09D 175/12

USPC .................................. 523/400; 525/452, 523
See application file for complete search history.

(56) References Cited

U.S. PATENT DOCUMENTS

| | | | |
|---|---|---|---|
| 4,596,678 A | 6/1986 | Merger et al. | |
| 4,596,679 A | 6/1986 | Hellbach et al. | |
| 5,087,739 A | 2/1992 | Bohmholdt et al. | |
| 2004/0229047 A1 | 11/2004 | Gurtler et al. | |
| 2007/0166550 A1 | 7/2007 | Westhoff et al. | |
| 2008/0248223 A1 | 10/2008 | Niederst et al. | |
| 2010/0319580 A1* | 12/2010 | Webster | C08G 18/2845 106/287.2 |

FOREIGN PATENT DOCUMENTS

| | | |
|---|---|---|
| DE | 100 13 186 A1 | 9/2001 |
| DE | 100 13 187 A1 | 10/2001 |
| DE | 103 08 105 A1 | 9/2004 |
| DE | 103 20 432 A1 | 12/2004 |
| DE | 10 2006 055 081 A1 | 5/2008 |
| EP | 0 126 299 A1 | 11/1984 |
| EP | 0 126 300 A1 | 11/1984 |
| EP | 0 355 443 A2 | 2/1990 |
| JP | 53-23397 A | 3/1978 |
| JP | 6-107765 A | 4/1994 |
| WO | WO 2004/076519 A1 | 9/2004 |
| WO | WO 2004/076520 A1 | 9/2004 |

OTHER PUBLICATIONS

International Search Report dated Jan. 14, 2015 in PCT/EP2014/068682 (with English language translation).

* cited by examiner

*Primary Examiner* — David T Karst
(74) *Attorney, Agent, or Firm* — Oblon, McClelland, Maier & Neustadt, L.L.P.

(57) ABSTRACT

The present invention describes new crosslinkers for coating compositions, their preparation, and their use.

12 Claims, No Drawings

CROSSLINKERS FOR COATING COMPOUNDS

The present invention describes new crosslinkers for coating compositions, their preparation, and their use.

The blocking of isocyanate groups with blocking agent is long-established and has already been a topic of reviews in the literature—see, for example, D. A. Wicks, Z. W. Wicks, Progress in Organic Coatings, 36, 148-172 (1999), 41, 1-83 (2001) and also 43, 131-140 (2001).

A disadvantage associated with the use of blocked isocyanates is that after the isocyanates have been deblocked, the blocking agents are expelled from the coating by heating and so result in emissions or else remain in the coating and may there lead to instances of discoloration, follow-on reaction, hazing, or blistering.

Known from D. C. Webster et al., Progress in Organic Coatings 57 (2006), 128-139 is the reaction of biurets and isocyanurates of 1,6-hexamethylene diisocyanate with glycidol. The resulting products can be crosslinked thermally, and there is also a proposal made for crosslinking with amines, though this is not explicitly implemented.

It was an object of the present invention to modify blocked isocyanates in such a way as to allow coatings to be obtained which do not exhibit the disadvantages set out above, or not to the same extent.

This object has been achieved by means of polyurethanes obtainable by reaction of
(A) at least one aliphatic or cycloaliphatic di- or polyisocyanate,
(B) at least one compound having at least one, preferably precisely one isocyanate-reactive group and at least one epoxy group, and
(C) at least one blocking agent with a group which is reactive both toward an isocyanate group and toward an epoxy group.

Additionally provided are coating compositions which comprise at least one polyurethane of the invention and also optionally solvent(s), optionally at least one catalyst and/or optionally typical coatings additives. Preferably there is at least one solvent present.

An advantage of the coating compositions of the invention is that even thick films can be cured therewith without blisters. Another advantage of the present invention is that the blocking agents used in the coating compositions of the invention are not released from the blocked polyisocyanates out of the coating, but instead are captured. The emissions of the cured coatings are therefore reduced.

Component (A)

At least one aliphatic or cycloaliphatic di- or polyisocyanate.

The monomeric isocyanates used for preparing the polyisocyanates may be aromatic, aliphatic or cycloaliphatic, preferably aliphatic or cycloaliphatic, referred to for short in this specification as (cyclo)aliphatic; aliphatic isocyanates are particularly preferred.

Aromatic isocyanates are those which comprise at least one aromatic ring system, in other words not only purely aromatic compounds but also araliphatic compounds.

Cycloaliphatic isocyanates are those which comprise at least one cycloaliphatic ring system. Aliphatic isocyanates are those which comprise exclusively linear or branched chains, i.e., acyclic compounds.

The monomeric isocyanates are preferably diisocyanates, which carry precisely two isocyanate groups. They can, however, in principle also be monoisocyanates, having one isocyanate group.

In principle, higher isocyanates having on average more than 2 isocyanate groups are also contemplated. Suitability therefor is possessed for example by triisocyanates such as triisocyanatononane, 2'-isocyanatoethyl 2,6-diisocyanatohexanoate, 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained, for example, by phosgenation of corresponding aniline/formaldehyde condensates and represent methylene-bridged polyphenyl polyisocyanates; more particularly triisocyanatononane and 2'-isocyanatoethyl 2,6-diisocyanatohexanoate.

The monomeric isocyanates are preferably isocyanates having 4 to 20 C atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate (e.g., methyl 2,6-diisocyanatohexanoate or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3 (or 4), 8 (or 9)-bis(isocyanatomethyl)tricyclo[5.2.1.0$^{2,6}$]decane isomer mixtures, and also aromatic diisocyanates such as tolylene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Particular preference is given to hexamethylene 1,6-diisocyanate, 1,3-bis(isocyanatomethyl)cyclohexane, isophorone diisocyanate, and 4,4'- or 2,4'-di(isocyanatocyclohexyl)methane, very particular preference to isophorone diisocyanate and hexamethylene 1,6-diisocyanate, and especial preference to hexamethylene 1,6-diisocyanate.

Mixtures of said isocyanates may also be present.

Isophorone diisocyanate is usually in the form of a mixture, specifically a mixture of the cis and trans isomers, generally in a proportion of about 60:40 to 90:10 (w/w), preferably of 70:30-90:10.

Dicyclohexylmethane 4,4'-diisocyanate may likewise be in the form of a mixture of the different cis and trans isomers.

For the present invention it is possible to use not only those diisocyanates obtained by phosgenating the corresponding amines but also those prepared without the use of phosgene, i.e., by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI) can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis takes place usually continuously in a circulation process and in the presence, optionally, of N-unsubstituted carbamic esters, dialkyl carbonates, and other by-products recycled from the reaction process. Diisocyanates obtained in this way generally contain a very low or even unmeasurable fraction of chlorinated compounds, which is advantageous, for example, in applications in the electronics industry.

In one embodiment of the present invention the isocyanates used have a hydrolyzable chlorine content of less than 100 ppm, more preferably less than 50 ppm, in particular less than 30 ppm, and especially less than 20 ppm. This can be measured using, for example, ASTM specification D4663-98. The amounts of total chlorine are, for example, below 1000 ppm, preferably below 800 ppm, and more preferably below 500 ppm (as determined by argentometric titration after hydrolysis).

It will be appreciated that it is also possible to employ mixtures of those monomeric isocyanates which have been obtained by reacting the (cyclo)aliphatic diamines with, for example, urea and alcohols and cleaving the resulting (cyclo)aliphatic biscarbamic esters, with those diisocyanates which have been obtained by phosgenating the corresponding amines.

The polyisocyanates which can be formed by oligomerizing the monomeric isocyanates are generally characterized as follows:

The average NCO functionality of such compounds is in general at least 1.8 and can be up to 8, preferably 2 to 5, and more preferably 2.4 to 4.

The isocyanate group content after oligomerization, calculated as NCO=42 g/mol, is generally from 5 to 25 wt % unless otherwise specified.

The polyisocyanates are preferably compounds as follows:

1) Polyisocyanates containing isocyanurate groups and derived from aromatic, aliphatic and/or cycloaliphatic diisocyanates. Particular preference is given in this context to the corresponding aliphatic and/or cycloaliphatic isocyanatoisocyanurates and in particular to those based on hexamethylene diisocyanate and isophorone diisocyanate. The isocyanurates present are, in particular, trisisocyanatoalkyl and/or trisisocyanatocycloalkyl isocyanurates, which constitute cyclic trimers of the diisocyanates, or are mixtures with their higher homologs containing more than one isocyanurate ring. The isocyanatoisocyanurates generally have an NCO content of 10 to 30 wt %, in particular 15 to 25 wt %, and an average NCO functionality of 2.6 to 8.

The polyisocyanates containing isocyanurate groups may to a minor extent also comprise urethane groups and/or allophanate groups, preferably with a bound-alcohol content of less than 2%, based on the polyisocyanate.

2) Polyisocyanates containing uretdione groups and having aromatically, aliphatically and/or cycloaliphatically attached isocyanate groups, preferably aliphatically and/or cycloaliphatically attached, and in particular those derived from hexamethylene diisocyanate or isophorone diisocyanate. Uretdione diisocyanates are cyclic dimerization products of diisocyanates.

The polyisocyanates containing uretdione groups are obtained frequently in a mixture with other polyisocyanates, more particularly those specified under 1). Polyisocyanates containing uretdione groups typically have functionalities of 2 to 3.

This also includes uretdione/isocyanurate mixtures of arbitrary composition, particularly with a monomeric-uretdione (dimer) content of 1-40%, especially 3-15, more particularly 5-10%.

For this purpose the diisocyanates can be reacted under reaction conditions under which not only uretdione groups but also the other polyisocyanates are formed, or the uretdione groups are formed first of all and are subsequently reacted to give the other polyisocyanates, or the diisocyanates are first reacted to give the other polyisocyanates, which are subsequently reacted to give products containing uretdione groups.

3) Polyisocyanates containing biuret groups and having aromatically, cycloaliphatically or aliphatically attached, preferably cycloaliphatically or aliphatically attached, isocyanate groups, especially tris(6-isocyanatohexyl)biuret or its mixtures with its higher homologs. These polyisocyanates containing biuret groups generally have an NCO content of 18 to 24 wt % and an average NCO functionality of 2.8 to 6.

4) Polyisocyanates containing urethane and/or allophanate groups and having aromatically, aliphatically or cycloaliphatically attached, preferably aliphatically or cycloaliphatically attached, isocyanate groups, such as may be obtained, for example, by reacting excess amounts of diisocyanate, such as of hexamethylene diisocyanate or of isophorone diisocyanate, with mono- or polyhydric alcohols. These polyisocyanates containing urethane and/or allophanate groups generally have an NCO content of 12 to 24 wt % and an average NCO functionality of 2.0 to 4.5. Polyisocyanates of this kind containing urethane and/or allophanate groups may be prepared without catalyst or, preferably, in the presence of catalysts, such as ammonium carboxylates or ammonium hydroxides, for example, or allophanatization catalysts, such as bismuth, cobalt, cesium, Zn(II) or Zr(IV) compounds, for example, in each case in the presence of monohydric, dihydric or polyhydric, preferably monohydric, alcohols.

These polyisocyanates containing urethane groups and/or allophanate groups occur frequently in hybrid forms with the polyisocyanates specified under 1).

5) Polyisocyanates comprising oxadiazinetrione groups, derived preferably from hexamethylene diisocyanate or isophorone diisocyanate. Polyisocyanates of this kind comprising oxadiazinetrione groups are accessible from diisocyanate and carbon dioxide.

6) Polyisocyanates comprising iminooxadiazinedione groups, derived preferably from hexamethylene diisocyanate or isophorone diisocyanate. Polyisocyanates of this kind comprising iminooxadiazinedione groups are preparable from diisocyanates by means of specific catalysts.

7) Hyperbranched polyisocyanates, of the kind known for example from DE-A1 10013186 or DE-A1 10013187.

8) Polyurethane-polyisocyanate prepolymers, from di- and/or polyisocyanates with alcohols.

9) Polyurea-polyisocyanate prepolymers.

10) The polyisocyanates 1)-9), preferably 1), 3), 4), and 6), can be converted, following their preparation, into polyisocyanates containing biuret groups or urethane/allophanate groups and having aromatically, cycloaliphatically or aliphatically attached, preferably (cyclo)aliphatically attached, isocyanate groups. The formation of biuret groups, for example, is accomplished by addition of water or by reaction with amines. The formation of urethane and/or allophanate groups is accomplished by reaction with monohydric, dihydric or polyhydric, preferably monohydric, alcohols, in the presence optionally of suitable catalysts. These polyisocyanates containing biuret or urethane/allophanate groups generally have an NCO content of 10 to 25 wt % and an average NCO functionality of 3 to 8.

11) Hydrophilically modified polyisocyanates, i.e., polyisocyanates which as well as the groups described under 1-10 also comprise groups which result formally from addition of molecules containing NCO-reactive groups and hydrophilizing groups onto the isocyanate groups of the above molecules. The latter groups are nonionic groups such as alkylpolyethylene oxide and/or ionic groups derived from phosphoric acid, phosphonic acid, sulfuric acid or sulfonic acid, and/or their salts.

12) Modified polyisocyanates for dual cure applications, i.e., polyisocyanates which as well as the groups described under 1-11 also comprise groups resulting formally from addition of molecules containing NCO-reactive groups and UV-crosslinkable or actinic-radiation-crosslinkable groups to the isocyanate groups of the above molecules. These molecules are, for example, hydroxyalkyl (meth) acrylates and other hydroxy-vinyl compounds.

In one preferred embodiment of the present invention the polyisocyanate is selected from the group consisting of isocyanurates, biurets, urethanes, and allophanates, preferably from the group consisting of isocyanurates, urethanes, and allophanates; more preferably it is a polyisocyanate containing isocyanurate groups.

In one particularly preferred embodiment the polyisocyanate comprises polyisocyanates comprising isocyanurate groups and based on hexamethylene 1,6-diisocyanate and/or isophorone diisocyanate, very preferably on hexamethylene 1,6-diisocyanate.

In one further preferred embodiment the polyisocyanate comprises a mixture of polyisocyanates comprising isocyanurate groups, very preferably of hexamethylene 1,6-diisocyanate and of isophorone diisocyanate.

In one particularly preferred embodiment the polyisocyanate is a mixture comprising low-viscosity polyisocyanates, preferably polyisocyanates comprising isocyanurate groups, having a viscosity of 600-1500 mPa*s, more particularly below 1200 mPa*s, low-viscosity urethanes and/or allophanates having a viscosity of 200-1600 mPa*s, more particularly 600-1500 mPa*s, and/or polyisocyanates comprising iminooxadiazinedione groups.

In this specification, unless noted otherwise, the viscosity is reported at 23° C. in accordance with DIN EN ISO 3219/A.3 in a cone/plate system with a shear rate of 1000 $s^{-1}$.

In one preferred embodiment, component (A) is a diisocyanate selected from the group consisting of isophorone diisocyanate, 2,4'-di(isocyanatocyclohexyl)methane, and 4,4'-di(isocyanatocyclohexyl)methane, and mixtures thereof, more preferably selected from the group consisting of isophorone diisocyanate and 4,4'-di(isocyanatocyclohexyl)methane.

In another preferred embodiment, component (A) comprises polyisocyanates selected from the group consisting of polyisocyanates containing isocyanurate groups and based on hexamethylene 1,6-diisocyanate, and polyisocyanates containing biuret groups and based on hexamethylene 1,6-diisocyanate.

Compound (B)

The compound (B) comprises at least one, as for example one to three, preferably one to two, and more preferably precisely one compound having at least one, as for example one to three, preferably one to two, and more preferably precisely one isocyanate-reactive group and at least one, preferably one to three, more preferably one to two, and very preferably precisely one epoxy group.

Isocyanate-reactive groups here are hydroxyl or thiol groups, preferably hydroxyl groups.

The compound (B) preferably comprises compounds of the formula (I)

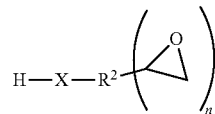

in which
X is oxygen (O) or sulfur (S), preferably oxygen (O),
n is a positive integer from 1 to 3, preferably 1 or 2, and more preferably 1, and
$R^2$ is an (n+1)-valent spacer comprising 1 to 10 atoms and/or groups of atoms, preferably an alkylene chain which has 1 to 10 carbon atoms and may optionally be interrupted by atoms other than carbon, preferably oxygen or nitrogen, more preferably oxygen.

Examples of compounds (B) with n=2 or 3 are

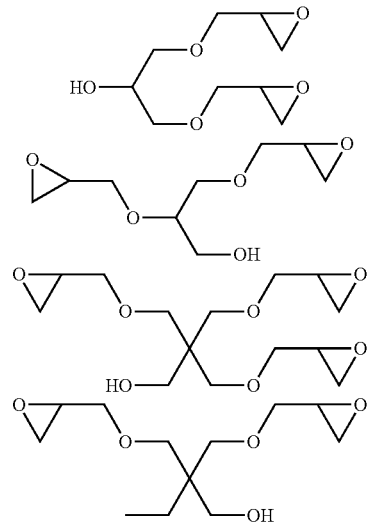

Preferred examples of $R^2$ with n=1 are methylene, 1,2-ethylene, 1,2-propylene, 1,3-propylene, 1,2-butylene, 1,3-butylene, 1,4-butylene, 1,6-hexylene, 1,8-octylene, 1,10-decylene, 2-oxa-1,4-butylene and 2,5-dioxa-1,7-heptylene. Particularly preferred are methylene and 1,2-ethylene.

Especially preferably, $R^2$ is methylene.

Preferred compounds (B) are glycerol diglycidyl ethers, more particularly a mixture thereof composed of compounds having a free primary and a free secondary hydroxyl group, trimethylolpropane diglycidyl ether, pentaerythritol triglycidyl ether, and glycidol; glycidol is particularly preferred.

Compound (C)

The compound (C) comprises compounds which are known as blocking agents for the blocking of free isocyanate groups and which additionally are reactive toward an epoxy group, i.e., have the capacity to open an epoxy group.

Classes of compound used for blocking are described in D. A. Wicks, Z. W. Wicks, Progress in Organic Coatings, 36, 148-172 (1999), 41, 1-83 (2001) and also 43, 131-140 (2001).

Examples of classes of compound used for blocking are phenols, imidazoles, triazoles, pyrazoles, oximes, N-hydroxyimides, hydroxybenzoic esters, secondary amines, lactams, CH-acidic cyclic ketones, malonic esters, or alkyl acetoacetates.

The blocking agent (C) is preferably selected from the group consisting of
secondary amines,
preferably cyclic secondary amines, di-$C_1$-$C_{10}$-alkylamines and di-$C_6$-$C_{12}$-cycloalkylamines, more preferably diethylamine, diisopropylamine, methylisopropylamine, methylbutylamine, 2,6-dimethylpiperidine, dicyclohexylamines, bis(3,5,5-trimethylcyclohexyl)amine, and 2,2,6,6-tetramethylpiperidine,
lactams,
particularly 2-pyrrolidone and caprolactam,
oximes,
particularly oximes of methyl n-amyl ketone, methyl isoamyl ketone, methyl 3-ethylheptyl ketone, methyl 2,4-dimethylpentyl ketone, butanone (methyl ethyl ketone), cyclohexanone, methyl isopropyl ketone, methyl isobutyl ketone, diisobutyl ketone, methyl tert-butyl ketone, diisopropyl ketone and 2,2,6,6-tetramethylcyclohexanone, more preferably butanone oxime (methyl ethyl ketone oxime),
pyrazoles,
particularly 3,5-dimethylpyrazole,
triazoles,
particularly 1,2,4-triazoles,
1,3-dicarbonyl compounds,
particularly acetylacetone, malonic di-$C_1$-$C_{10}$ alkyl esters and acetoacetic $C_1$-$C_{10}$ alkyl esters, more preferably diethyl malonate and ethyl acetoacetate.

With particular preference the blocking agents (C) are the above-recited secondary amines, oximes, pyrazoles, and 1,3-dicarbonyl compounds, very preferably diisopropylamine, 2,6-dimethylpiperidine, 2,2,6,6-tetramethylpiperidine, butanone oxime, diethyl malonate, and ethyl acetoacetate.

For the preparation of the polyurethanes of the invention it should be ensured that the blocking agents (C) are reactive both toward isocyanate groups and toward epoxy groups. A preferred procedure therefore involves first subjecting at least one di- or polyisocyanate (A) to partial reaction with at least one blocking agent (C), and subsequently subjecting the remaining free isocyanate groups to at least partial reaction with at least one compound (B). Before the compound (B) is used in the second step, the blocking agent (C) ought already to have been substantially consumed by reaction with the isocyanate groups, or to have been removed from the reaction mixture.

The ratio of epoxy groups in (B) to groups reactive toward epoxy groups in (C) in the polyurethanes of the invention is generally from 2:1 to 1:2, preferably from 1.5:1 to 1:1.5, more preferably from 1.5:1 to 1:1, very preferably from 1.2:1 to 1:1.

The ratio of isocyanate-reactive groups—XH in (B) and isocyanate-reactive groups in (C) in total to isocyanate groups in (A) is generally selected such that at least 50 mol % of the isocyanate groups in (A) are reacted with compounds (B) and (C), preferably at least 66 to 100 mol %, more preferably at least 75 to 100 mol %, very preferably at least 85 to 100 mol %, and more particularly 95 to 100 mol %. In one preferred embodiment substantially all of the free isocyanate groups in (A) are reacted with isocyanate-reactive groups from (B) and (C).

The preparation of the polyurethanes of the invention, more particularly the reaction of the compound (B), but also of the compound (C), takes place in the presence of at least one catalyst as set out further below.

Preferred catalysts are Lewis-acidic organometallic compounds such as dibutyltin dilaurate, dioctyltin dilaurate, zinc(II) diacetate, zinc(II) dioctoate, zirconium acetylacetonate and zirconium 2,2,6,6-tetramethyl-3,5-heptanedionate, and bismuth compounds—for toxicological reasons, more particularly the compounds not containing tin.

The polyurethane of the invention is prepared in general at temperatures of 40° C. to 130° C., preferably 50 to 120° C., and more preferably 60 to 100° C.

During the preparation there is preferably at least one solvent present, as set out further below, and this solvent preferably also remains in the coating composition.

In one preferred embodiment, polyurethanes of the invention have an NCO content of less than 7 wt % (calculated with a molar weight of 42 g/mol). In this case the polyurethanes of the invention do not require the presence of binders in coating compositions.

Polyurethanes of this kind can then be used preferably in one-component coating compositions.

In a further preferred embodiment, polyurethanes of the invention have an NCO content of at least 7 wt % (calculated with a molar weight of 42 g/mol). This is especially preferred when the polyurethanes of the invention are admixed with at least one binder in coating compositions.

In one preferred embodiment the polyurethanes of the invention are reaction products of a polyisocyanate containing isocyanurate groups and based on hexamethylene 1,6-diisocyanate, preferably based on hexamethylene 1,6-diisocyanate, with a compound (B), preferably of the formula (I), more preferably glycidol, and with a blocking agent (C), the polyurethane having the formula (II)

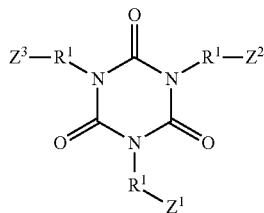

in which
$R^1$ at each occurrence is 1,6-hexylene,

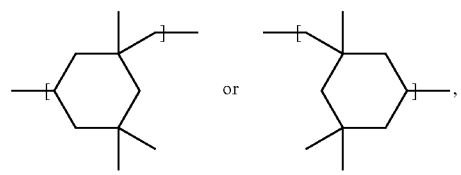

preferably 1,6-hexylene and
$Z^1$, $Z^2$ and $Z^3$ each independently of one another are selected from the group consisting of
a free isocyanate group (—NCO),
a blocked isocyanate group, and a group of the formula (III)

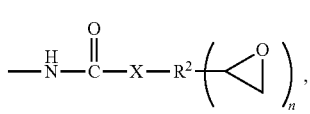
(III)

in which

X is oxygen (O) or sulfur (S), preferably oxygen, and n and $R^2$ are as defined above, where at least one of the groups $Z^1$ to $Z^3$ is a blocked isocyanate group, and at least one of the groups $Z^1$ to $Z^3$ is a group of the formula (III).

In one particularly preferred embodiment, the polyurethane of the invention is of the formula (IV)

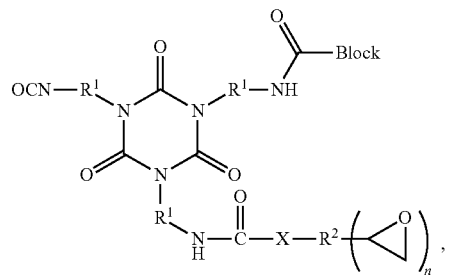
(IV)

in which

Block is a radical of a blocking agent (C) from which a hydrogen atom has been abstracted, X is oxygen (O) or sulfur (S), $R^1$ at each occurrence is 1,6-hexylene,

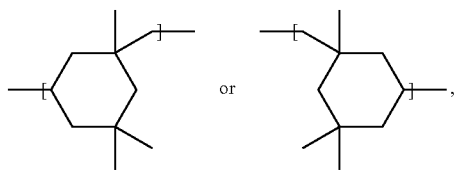

preferably 1,6-hexylene, and n and $R^2$ are as defined above.

Examples of the "Block" group, therefore, are for secondary amines, exemplified here using diisopropylamine,

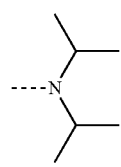

for lactams, exemplified here using caprolactam,

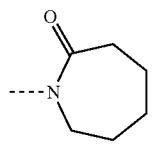

for oximes, exemplified here using methyl ethyl ketone oxime,

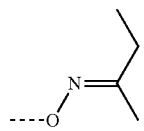

for pyrazoles, exemplified here using 3,5-dimethylpyrazole,

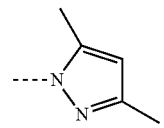

for triazoles, exemplified here using 1,2,4-triazole,

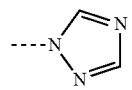

and for 1,3-dicarbonyl compounds, exemplified here using diethyl malonate,

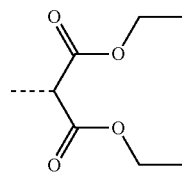

The bond to the isocyanate group is shown with a dashed line.

In a further preferred embodiment, the polyurethanes of the invention are reaction products of a polyisocyanate containing biuret groups and based on hexamethylene 1,6-diisocyanate, preferably based on hexamethylene 1,6-diisocyanate, with a compound (B), preferably of the formula (I), more preferably glycidol, and with a blocking agent (C), the polyurethane having the formula (V)

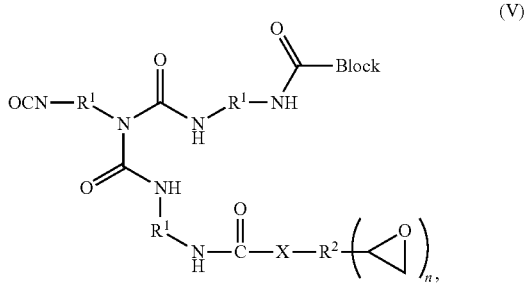

(V)

in which

Block is a radical of a blocking agent (C) from which a hydrogen atom has been abstracted, X is oxygen (O) or sulfur (S), $R^1$ at each occurrence is 1,6-hexylene, and n and $R^2$ are as defined above.

It is also possible, furthermore, optionally for a solvent or solvent mixture to be present.

Solvents which can be used are those which preferably have no groups that are reactive toward isocyanate groups or toward capped isocyanate groups.

Possible solvents are, for example, esters, ethers, ketones, aromatic solvents, alkoxylated alkyl alkanoates, carbonates, and mixtures of the solvents.

Esters are, for example, n-butyl acetate, ethyl acetate, 1-methoxyprop-2-yl acetate, and 2-methoxyethyl acetate.

Ethers are, for example, THF, dioxane, and also the dimethyl, diethyl or di-n-butyl ethers of ethylene glycol, diethylene glycol, triethylene glycol, propylene glycol, dipropylene glycol, or tripropylene glycol.

Ketones are, for example, acetone, ethyl methyl ketone, diethyl ketone, isobutyl methyl ketone, methyl amyl ketone, and tert-butyl methyl ketone. Acetone is less preferable on account of its flash point.

Preferred as aromatic hydrocarbon are, in particular, xylene and toluene, more particularly xylene. Examples thereof are the Solvesso® products from ExxonMobil Chemical, especially Solvesso® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the Shellsol® products from Shell, Caromax® (e.g., Caromax® 18) from Petrochem Carless, and Hydrosol from DHC (in the form, for example, of Hydrosol® A 170).

Further possible solvents are butylglycol diacetate (Merck Schuchardt OHG), butylglycol acetate (Merck Schuchardt OHG), dipropylene glycol dimethyl ether (Proglyde® DMM, Sigma-Aldrich, Germany), 3-methoxy-n-butyl acetate (Butoxyl, F. B. Silbermann GmbH), dipropylene glycol n-butyl ether (BDG, Dowanol® DPnB, Dow Chemical Company), and propylene carbonate.

Alcohols can also be used as solvents, but ought to be kept low in their amount, particularly if they are monofunctional alcohols. Alcohols are less preferable.

Preferred solvents are n-butyl acetate, ethyl acetate, 1-methoxyprop-2-yl acetate, 2-methoxyethyl acetate, xylene, toluene, and mixtures thereof.

Further, typical coatings components and/or additives used may be the following, for example: stabilizers, UV stabilizers such as UV absorbers and suitable free-radical scavengers (especially HALS compounds, hindered amine light stabilizers), activators (accelerators), drying agents, fillers, pigments, dyes, antistatic agents, flame retardants, thickeners, thixotropic agents, surface-active agents, viscosity modifiers, plasticizers or chelating agents. UV stabilizers are preferred.

Suitable UV absorbers encompass oxanilides, triazines and benzotriazole (the latter available, for example, as Tinuvin® products from BASF SE) and benzophenones (e.g., Chimassorb® 81 from BASF SE). Preference is given, for example, to 95% benzenepropanoic acid, 3-(2H-benzotriazole-2-yl)-5-(1,1-dimethylethyl)-4-hydroxy-, C7-9 branched and linear alkyl esters; 5% 1-methoxy-2-propyl acetate (e.g., Tinuvin® 384) and α-[3-[3-(2H-benzotriazol-2-yl)-5-(1,1-dimethylethyl)-4-hydroxyphenyl]-1-oxopropyl]-ω-hydroxypoly(oxo-1,2-ethanediyl) (e.g., Tinuvin® 1130), in each case products, for example, of BASF SE. DL-alpha-tocopherol, tocopherol, cinnamic acid derivatives, and cyanoacrylates can likewise be used for this purpose.

These can be employed alone or together with suitable free-radical scavengers, examples being sterically hindered amines (often also identified as HALS or HAS compounds; hindered amine (light) stabilizers) such as 2,2,6,6-tetramethylpiperidine, 2,6-di-tert-butylpiperidine or derivatives thereof, e.g., bis(2,2,6,6-tetramethyl-4-piperidyl) sebacate. They are obtainable, for example, as Tinuvin® products and Chimassorb® products from BASF SE. Preference in joint use with Lewis acids, however, is given to those hindered amines which are N-alkylated, examples being bis(1,2,2,6, 6-pentamethyl-4-piperidinyl) [[3,5-bis(1,1-dimethylethyl)-4-hydroxyphenyl]methyl]butylmalonate (e.g., Tinuvin® 144 from BASF SE); a mixture of bis(1,2,2,6,6-pentamethyl-4-piperidinyl)sebacate and methyl(1,2,2,6,6-pentamethyl-4-piperidinyl) sebacate (e.g., Tinuvin® 292 from BASF SE); or which are N—(O-alkylated), such as, for example, decanedioic acid, bis(2,2,6,6-tetramethyl-1-(octyloxy)-4-piperidinyl) ester, reaction products with 1,1-dimethylethyl hydroperoxide and octane (e.g., Tinuvin® 123 from BASF SE). UV stabilizers are used typically in amounts of 0.1 to 5.0 wt %, based on the solid components present in the preparation.

Suitable thickeners include, in addition to free-radically (co)polymerized (co)polymers, typical organic and inorganic thickeners such as hydroxymethylcellulose or bentonite.

Chelating agents which can be used include, for example, ethylenediamineacetic acid and salts thereof and also β-diketones.

Pigments in the true sense are, according to CD Römpp Chemie Lexikon—Version 1.0, Stuttgart/New York: Georg Thieme Verlag 1995, with reference to DIN 55943, particulate "colorants that are organic or inorganic, chromatic or achromatic and are virtually insoluble in the application medium".

Virtually insoluble here means a solubility at 25° C. below 1 g/1000 g application medium, preferably below 0.5, more preferably below 0.25, very particularly preferably below 0.1, and in particular below 0.05 g/1000 g application medium.

Examples of pigments in the true sense encompass any desired systems of absorption pigments and/or effect pigments, preferably absorption pigments. There are no restrictions whatsoever on the number and selection of the pigment components. They may be adapted as desired to the particular requirements, such as the desired perceived color, for example, as described in step a), for example. It is possible for example for the basis to be all the pigment components of a standardized mixer coating system.

Effect pigments are all pigments which exhibit a platelet-shaped construction and give a surface coating specific decorative color effects. The effect pigments are, for example, all of the pigments which impart effect and can be used typically in vehicle finishing and industrial coatings. Examples of such effect pigments are pure metallic pigments, such as aluminum, iron or copper pigments; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum; or liquid-crystal pigments, for example.

The coloring absorption pigments are, for example, typical organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments, titanium dioxide, and carbon black.

Dyes are likewise colorants, and differ from the pigments in their solubility in the application medium; i.e., they have a solubility at 25° C. of more than 1 g/1000 g in the application medium.

Examples of dyes are azo, azine, anthraquinone, acridine, cyanine, oxazine, polymethine, thiazine, and triarylmethane dyes. These dyes may find application as basic or cationic dyes, mordant dyes, direct dyes, disperse dyes, development dyes, vat dyes, metal complex dyes, reactive dyes, acid dyes, sulfur dyes, coupling dyes or substantive dyes.

Coloristically inert fillers are all substances/compounds which on the one hand are coloristically inactive, i.e., exhibit a low intrinsic absorption and have a refractive index similar to that of the coating medium, and which on the other hand are capable of influencing the orientation (parallel alignment) of the effect pigments in the surface coating, i.e., in the applied coating film, and also properties of the coating or of the coating compositions, such as hardness or rheology, for example. Inert substances/compounds which can be used are given by way of example below, but without restricting the concept of coloristically inert, topology-influencing fillers to these examples. Suitable inert fillers meeting the definition may be, for example, transparent or semitransparent fillers or pigments, such as silica gels, blanc fixe, kieselguhr, talc, calcium carbonates, kaolin, barium sulfate, magnesium silicate, aluminum silicate, crystalline silicon dioxide, amorphous silica, aluminum oxide, microspheres or hollow microspheres made, for example, of glass, ceramic or polymers, with sizes of 0.1-50 μm, for example. Additionally as inert fillers it is possible to employ any desired solid inert organic particles, such as urea-formaldehyde condensates, micronized polyolefin wax and micronized amide wax, for example. The inert fillers can in each case also be used in a mixture. It is preferred, however, to use only one filler in each case.

Preferred fillers encompass silicates, examples being silicates obtainable by hydrolysis of silicon tetrachloride, such as Aerosil® from Degussa, siliceous earth, talc, aluminum silicates, magnesium silicates, calcium carbonates, etc.

A further optional constituent of the coating composition is a catalyst. In one preferred embodiment there is at least one catalyst present. This may be, for example, an amine or, preferably, an organometallic compound. Preferred catalysts are those which also catalyze the deblocking of the polyurethanes of the invention.

Amines are, for example, tertiary aliphatic, cycloaliphatic or aromatic amines. Examples thereof are triethylamine, tri-n-butylamine, N-methylmorpholine, N-methylpiperidine, pyrrolidine, imidazole, quinuclidine, preferably 1,4-diazabicyclo[2.2.2]octane.

Examples of suitable organometallic compounds include tin compounds, as for example tin(II) salts of organic carboxylic acids, e.g., tin(II) diacetate, tin(II) dioctoate, tin(II) bis(ethylhexanoate), and tin(II) dilaurate, and the toxicologically objectionable dialkyltin(IV) salts of organic carboxylic acids, e.g., dimethyltin diacetate, dibutyltin diacetate, dibutyltin dibutyrate, dibutyltin bis(2-ethylhexanoate), dibutyltin dilaurate, dibutyltin maleate, dioctyltin dilaurate, and dioctyltin diacetate, especially dibutyltin dilaurate.

Other and more strongly preferred Lewis-acidic organometallic compounds are zinc salts, examples being zinc(II) diacetate and zinc(II) dioctoate.

Tin-free and zinc-free alternatives used preferably include organic metal salts of bismuth, zirconium, titanium, aluminum, cerium, cesium, iron, manganese, nickel, and cobalt.

These are, for example, zirconium tetraacetylacetonate (e.g., K-KAT® 4205 from King Industries); zirconium dionates (e.g., K-KAT® XC-9213; XC-A 209 and XC-6212 from King Industries); bismuth compounds, especially tricarboxylates (e.g., K-KAT® 348, XC-B221; XC-C227, and XC 8203 from King Industries); aluminum dionate (e.g., K-KAT® 5218 from King Industries). Tin-free and zinc-free catalysts are otherwise also available, for example, under the trade name Borchi® Kat from Borchers, TK from Goldschmidt, or BICAT® from Shepherd, Lausanne.

Bismuth catalysts are more particularly bismuth carboxylates, especially bismuth octoates, ethylhexanoates, neodecanoates, or pivalates; examples are K-KAT 348 and XK-601 from King Industries, TIB KAT 716, 716LA, 716XLA, 718, 720, and 789 from TIB Chemicals, and those from Shepherd Lausanne, and also catalyst mixtures of, for example, bismuth organyls and zinc organyls.

Further metal catalysts are described by Blank et al. in Progress in Organic Coatings, 1999, Vol. 35, pages 19-29.

These catalysts are suitable accordingly for solventborne, waterborne and/or blocked systems.

Molybdenum, tungsten, and vanadium catalysts are described more particularly for the conversion of blocked polyisocyanates in WO 2004/076519 and WO 2004/076520.

Preferred Lewis-acidic organometallic compounds are dibutyltin dilaurate, dioctyltin dilaurate, zinc(II) diacetate, zinc(II) dioctoate, zirconium acetylacetonate and zirconium 2,2,6,6-tetramethyl-3,5-heptanedionate, and bismuth compounds, on toxicological grounds, especially the non-tin-containing compounds.

The substrates are coated by typical methods known to the skilled worker, with at least one coating composition being applied in the desired thickness to the substrate to be coated, and the volatile constituents of the coating composition that are optionally present being removed, optionally with heating. This operation may if desired be repeated one or more times. Application to the substrate may take place in a known way, as for example by spraying, troweling, knife-coating, brushing, rolling, roller coating, flow coating, laminating, injection backmolding or coextruding.

The thickness of a film of this kind for curing may be from 0.1 μm up to several mm (e.g., (structural) adhesives, poured floors, primers, troweling fillers). Preference is given to 5 to 200 μm, more preferably from 5 to 60 μm, especially preferably 20-50 μm (based on the coating in the state in which the solvent has been removed from the system).

In one preferred embodiment of the present invention the coating compositions of the invention can be used to obtain coatings in a thickness of 0.5 to 10 mm. With the coating compositions of the invention, blocking agent eliminated from the coating does not cause blistering.

The polyurethane coatings of the invention are produced by applying to a substrate at least one polyurethane of the invention, optionally mixed with at least one further polyisocyanate, as set out above under compound (A), which is different from the polyurethane of the invention, and heating to a temperature at which at least some of the blocked isocyanate groups are cleaved significantly into free isocyanate groups and free blocking agent (C).

"Significantly" here means at least 10 mol % of the blocked isocyanate groups, preferably at least 25, more preferably at least 40, very preferably at least 50, more particularly at least 66, and especially at least 75 mol %.

The temperature for the curing of the coating and deblocking is dependent in each case on the blocking agent (C) used and may be preferably from 100 to 160° C. The duration is generally from 5 minutes to 3 hours, preferably from 10 minutes to 2.5 hours, and more preferably 15 minutes to 2 hours.

Under these conditions, the blocking agent (C) is released from the blocked isocyanate group, and so the isocyanate group that is then free is ready for reaction, and the blocking agent reacts with the epoxy group of component (B).

It is thought that an intermediate in this curing process is a compound of the following formula (shown here using, as example, a polyisocyanate containing isocyanurate groups).

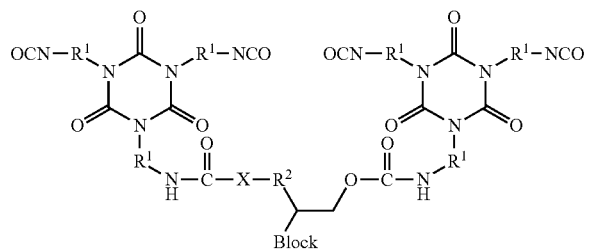

in which $R^1$, $R^2$, X, and Block have the above definitions and n is 1.

The blocking agent (C) here is released from the blocked isocyanate group and reacts with the epoxy group of component (B). The hydroxyl group that forms in the course of this reaction with the epoxy group then reacts with a free isocyanate group to form a urethane group.

A further optional constituent of such coating compositions may be a further polyisocyanate (D), which is different from the polyurethane of the invention, and which may comprise di- or polyisocyanates of the kind described above under component (A).

Additionally provided by the present invention are substrates coated with a coating composition of the invention.

Polyurethane coating materials of this kind are especially suitable for applications requiring particularly high application reliability, exterior weathering resistance, optical qualities, solvent resistance, chemical resistance, and/or water resistance.

The two-component coating compositions and coating formulations obtained are suitable for coating substrates such as wood, wood veneer, paper, cardboard, paperboard, textile, film, leather, nonwoven, plastics surfaces, glass, ceramic, mineral building materials, such as molded cement blocks and fiber-cement slabs, or metals, which in each case may optionally have been precoated or pretreated.

The selection of the substrate is generally limited by its thermal stability, and so preferred substrates are those which are stable under the conditions of deblocking.

Coating compositions of this kind are suitable as or in interior or exterior coatings, i.e., in those applications where there is exposure to daylight, preferably of parts of buildings, coatings on (large) vehicles and aircraft, and industrial applications, utility vehicles in agriculture and construction, decorative coatings, bridges, buildings, power masts, tanks, containers, pipelines, power stations, chemical plants, ships, cranes, posts, sheet piling, valves, pipes, fittings, flanges, couplings, halls, roofs, and structural steel, furniture, windows, doors, wood block flooring, can coating, and coil coating, for floor coverings, such as in parking levels or in hospitals, and in automotive finishes, as OEM and refinish.

ppm and percent figures used in this specification relate, unless otherwise indicated, to percent by weight and ppm by weight.

The examples which follow are intended to elucidate the invention, but not to confine it to these examples.

EXAMPLES

Raw Materials

Basonat® HI 100: polyisocyanate available commercially from BASF SE, Ludwigshafen, containing isocyanurate groups, based on hexamethylene 1,6-diisocyanate, and having an NCO content of 21.8% and a viscosity of 2800 mPa*s at 23° C.

Inventive Example

Example 1: Basonat HI+diisopropylamine+glycidol 404.6 g of Basonat® HI 100 and 106.05 g of diisopropylamine were reacted in 252.15 g of butyl acetate. After about an hour at room temperature, the NCO content was 5.9%. Then 77.7 g of glycidol and 27 ppm of dibutyltin dilaurate were added. After about 6 hours at 60° C., the NCO content was 0.0%. The corresponding product had a viscosity of 1600 mPas.

Comparative Example 1

Product 1a: 143.3 g of Basonat® HI 100 and 75.8 g of diisopropylamine were reacted in 93.9 g of butyl acetate. After 80 minutes at room temperature, the NCO content was 0.0%.

Product 1b: 143.3 g of Basonat® HI 100 and 55.00 g of glycidol were reacted in the presence of 50.3 g of butyl acetate and 27 ppm of dibutyltin dilaurate. After 80 minutes at 60° C., the NCO content was 0.0%.

The two products were mixed, the mixing operation producing an inhomogeneous turbid solution.

Example 2

144.5 g of Basonat® HI 100, 83.3 g of isophorone diisocyanate, and 75.8 g of diisopropylamine were reacted in 153.9 g of butyl acetate. After 20 minutes at room temperature, the NCO content was 7.1%. Then 55.5 g of glycidol and 27 ppm of dibutyltin dilaurate were added. After about 6 hours at 60° C., the NCO content was 0.0%. The corresponding product had a viscosity of 1300 mPas.

Example 3

144.5 g of Basonat® HI 100, 98.3 g of 1-isocyanato-4-[(4'-isocyanatocyclohexyl)methyl] cyclohexane (H12MDI), and 75.8 g of diisopropylamine were reacted in 160.3 g of butyl acetate. After 20 minutes at room temperature, the NCO content was 6.8%. Then 55.5 g of glycidol and 27 ppm of dibutyltin dilaurate were added. After about 6 hours at 60° C., the NCO content was 0.0%. The corresponding product had a viscosity of 1640 mPas at 23° C.

Example 4

202.3 g of Basonat® HI 100, 45.7 g of N-methylbutylamine were reacted in 122.9 g of butyl acetate. After 20 minutes at room temperature, the NCO content was 6.0%. Then 38.9 g of glycidol and 56 ppm of dibutyltin dilaurate were added. After about 6 hours at 60° C., the NCO content was 0.0%. The corresponding product had a viscosity of 2100 mPas at 23° C.

Example 5

404.6 g of Basonat® HI 100, 92.4 g of 2-butanone oxime were reacted in 245.9 g of butyl acetate. After 20 minutes at room temperature, the NCO content was 6.0%. Then 77.7 g of glycidol and 28 ppm of dibutyltin dilaurate were added. After about 6 hours at 60° C., the NCO content was 0.0%. The corresponding product had a viscosity of 2100 mPas at 23° C.

Example 6

404.6 g of Basonat® HI 100, 100.8 g of 3,5-dimethylpyrazole were reacted in 249.9 g of butyl acetate. After 20 minutes at room temperature, the NCO content was 6.0%. Then 77.7 g of glycidol and 28 ppm of dibutyltin dilaurate were added. After about 6 hours at 60° C., the NCO content was 0.0%. The corresponding product had a viscosity of 2100 mPas at 23° C.

Example 7

144.5 g of Basonat® HI 100 and 50.5 g of diisopropylamine were reacted in 105.4 g of butyl acetate. After 30 minutes at room temperature, the NCO content was 3.1%. The mixture was subsequently allowed to react with 51.0 g of glycerol diglycidyl ether at 60° C.

Tests:

For the measurement of the pendulum damping, the samples were applied in a wet film thickness of 400 μm to glass plates, evaporated at room temperature for 15 minutes, and cured at the temperature and time indicated in the table.

The pendulum damping was measured in accordance with DIN 53157, with high values denoting high hardness. The FIGURE reported is the mean of three measurements.

| Composition | Curing Temp. | Time | Pendulum damping Swings |
|---|---|---|---|
| Example 1 | 110° C. | 30 min | 2 |
| " | " | 60 min | 2 |
| " | " | 120 min | 4 |
| " | 130° C. | 30 min | 5 |
| " | " | 60 min | 16 |
| " | " | 120 min | 55 |
| " | 150° C. | 30 min | 7 |
| " | " | 60 min | 113 |
| " | " | 120 min | 122 |
| Example 2 | 110° C. | 30 min | 26 |
| " | " | 60 min | 26 |

-continued

| Composition | Curing Temp. | Time | Pendulum damping Swings |
|---|---|---|---|
| " | " | 120 min | 57 |
| " | 130° C. | 30 min | 38 |
| " | " | 60 min | 85 |
| " | " | 120 min | 117 |
| " | 150° C. | 30 min | 49 |
| " | " | 60 min | 133 |
| " | " | 120 min | 130 |
| Example 3 | 110° C. | 30 min | 21 |
| " | " | 60 min | 35 |
| " | " | 120 min | 65 |
| " | 130° C. | 30 min | 62 |
| " | " | 60 min | 74 |
| " | " | 120 min | 120 |
| " | 150° C. | 30 min | 66 |
| " | " | 60 min | 130 |
| " | " | 120 min | 121 |
| Example 4 | 110° C. | 30 min | 2 |
| " | " | 60 min | 4 |
| " | " | 120 min | 12 |
| " | 130° C. | 30 min | 10 |
| " | " | 60 min | 23 |
| " | " | 120 min | 44 |
| " | 150° C. | 30 min | 15 |
| " | " | 60 min | 26 |
| " | " | 120 min | 45 |

Application Example

The coating composition from example 1 was cured repeatedly with different catalysts (0.5 wt % catalyst).

| Catalyst | Curing Temp. | Time | Pendulum damping Swings |
|---|---|---|---|
| No catalyst | 130° C. | 120 min | 56 |
| 1,4-Diazabicyclo[2.2.2]octane (TEDA) | 130° C. | 120 min | 131 |
| Tin 2-ethylhexanoate | 130° C. | 120 min | 97 |
| Aluminum tributylate | 130° C. | 120 min | 72 |
| Imidazole | 130° C. | 120 min | 125 |

The invention claimed is:

1. A polyurethane of formula (IIa), formula (IIb), formula (IIc), or formula (V):

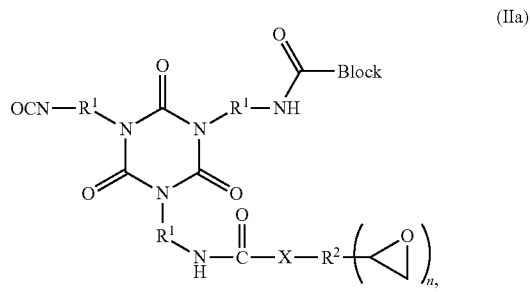

-continued

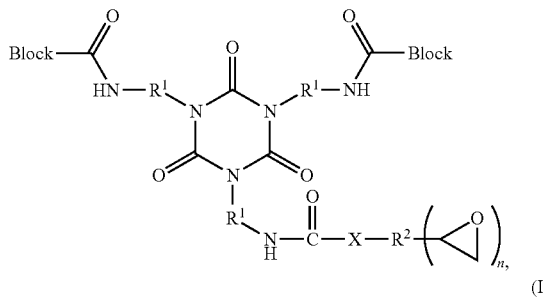
(IIb)

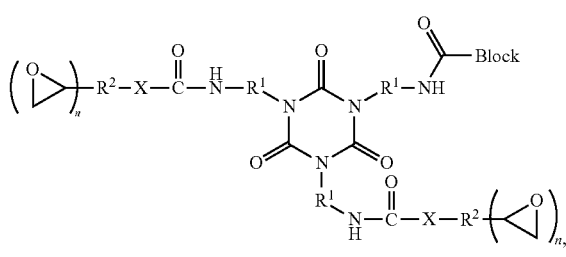
(IIc)

and

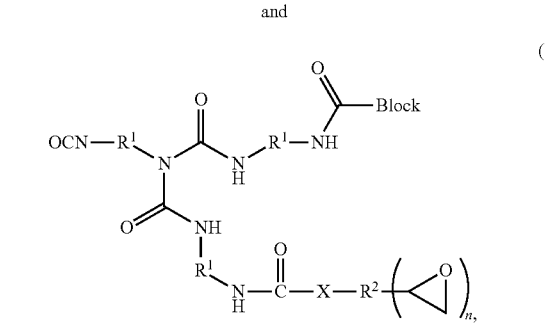
(V)

wherein:
each R¹ is 1,6-hexylene,

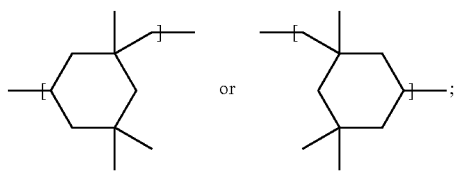

each X is oxygen (O) or sulfur (S);
each n is a positive integer from 1 to 3;
each R² is an (n+1)-valent alkylene chain having 1 to 10 atoms and optionally interrupted by oxygen or nitrogen atoms; and
each Block is a radical of a blocking agent (C) from which a hydrogen atom has been abstracted, wherein the blocking agent (C) is selected from the group consisting of:
a secondary amine selected from the group consisting of a cyclic secondary amine, a di-$C_1$-$C_{10}$-alkylamine, and a di-$C_6$-$C_{12}$-cycloalkylamine;
a lactam selected from the group consisting of 2-pyrrolidone and caprolactam;
an oxime selected from the group consisting of an oxime of methyl n-amyl ketone, an oxime of methyl isoamyl ketone, an oxime of methyl 3-ethylheptyl ketone, an oxime of methyl 2,4-dimethylpentyl ketone, an oxime of butanone (methyl ethyl ketone), an oxime of cyclohexanone, an oxime of methyl isopropyl ketone, an oxime of methyl isobutyl ketone, an oxime of diisobutyl ketone, an oxime of methyl tert-butyl ketone, an oxime of diisopropyl ketone and an oxime of 2,2,6,6-tetramethylcyclohexanone;
3,5-dimethylpyrazole;
a 1,2,4-triazole; and
1,3-dicarbonyl compound selected from the group consisting of acetylacetone, a malonic di-$C_1$-$C_{10}$ alkyl ester, and an acetoacetic di-$C_1$-$C_{10}$ alkyl ester.

2. The polyurethane according to claim 1, which is a compound of formula (IIa).

3. The polyurethane according to claim 2, wherein, in formula (IIa):
R¹ at each occurrence is 1,6-hexylene; and
n is 1.

4. The polyurethane according to claim 1, which is a compound of formula (V).

5. The polyurethane according to claim 1, which has an NCO content of less than 7 wt %, calculated with a molar weight of 42 g/mol.

6. A coating composition, comprising
at least one polyurethane according to claim 1;
optionally a solvent;
optionally typical coatings additives; and
optionally at least one catalyst.

7. The coating composition according to claim 6, comprising the catalyst, wherein the catalyst comprises dibutyltin dilaurate, dioctyltin dilaurate, zinc(II) diacetate, zinc(II) dioctoate, zirconium acetylacetonate, zirconium 2,2,6,6-tetramethyl-3,5-heptanedionate, or bismuth compounds.

8. A process for preparing a polyurethane according to claim 1, the process comprising:
subjecting hexamethylene 1,6-diisocyanate or isophorone diisocyanate to partial reaction with the blocking agent (C) and subsequently subjecting the remaining free isocyanate groups to at least partial reaction with a compound (B) of formula (I)

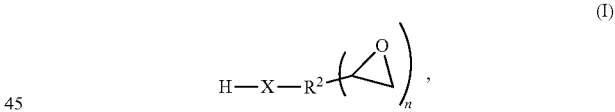
(I)

in which X, n, and R² are as defined in claim 1.

9. A process for producing a polyurethane coating, the process comprising:
applying at least one polyurethane according to claim 1, optionally mixed with at least one further polyisocyanate different from the polyurethane, to a substrate; and
heating to a temperature at which at least some of the blocked isocyanate groups are cleaved significantly into free isocyanate groups and free blocking agent (C).

10. A one-component coating composition, comprising a polyurethane according to claim 1.

11. The polyurethane according to claim 1, having formula (IIb), wherein:
R¹ at each occurrence is 1,6-hexylene, and
n is 1.

12. The polyurethane according to claim 1, having formula (IIc), wherein:
R¹ at each occurrence is 1,6-hexylene; and
n is 1.

* * * * *

UNITED STATES PATENT AND TRADEMARK OFFICE
CERTIFICATE OF CORRECTION

PATENT NO. : 10,227,504 B2  
APPLICATION NO. : 15/024153  
DATED : March 12, 2019  
INVENTOR(S) : Frederic Lucas Page 1 of 1

It is certified that error appears in the above-identified patent and that said Letters Patent is hereby corrected as shown below:

In the Specification

Column 13, Line 39, "exampies" should read --examples--.

In the Claims

Column 20, Line 59, Claim 11, "(lib)," should read --(IIb),--.

Signed and Sealed this  
Twenty-eighth Day of April, 2020

Andrei Iancu  
*Director of the United States Patent and Trademark Office*